No. 761,041. PATENTED MAY 24, 1904.
L. GATHMANN.
DRIER.
APPLICATION FILED OCT. 1, 1903.
NO MODEL.
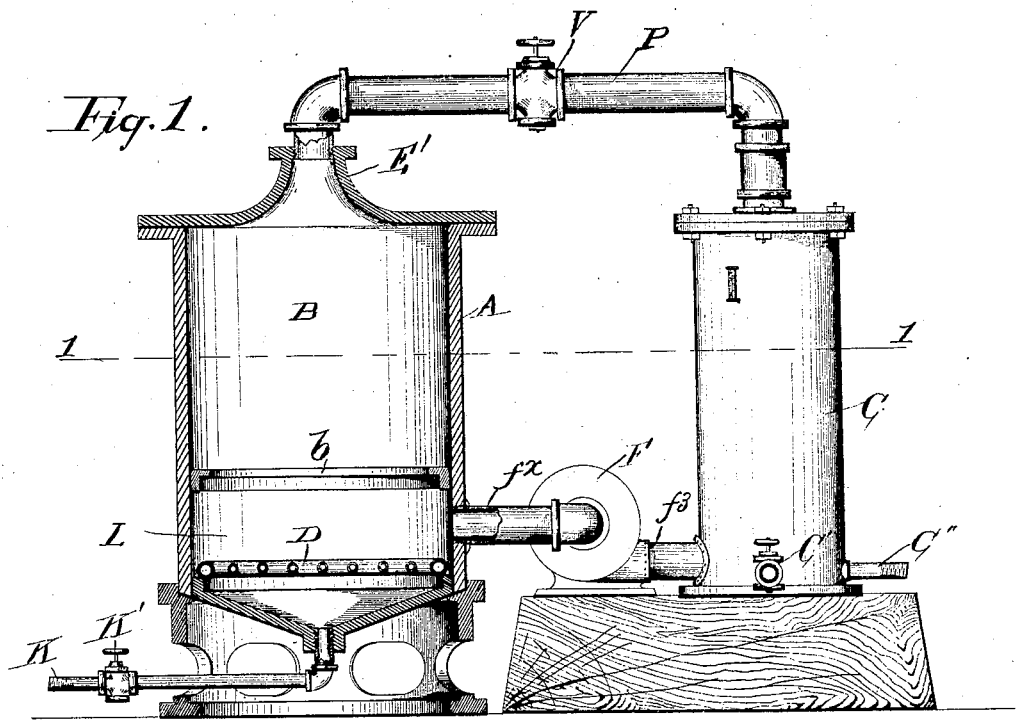
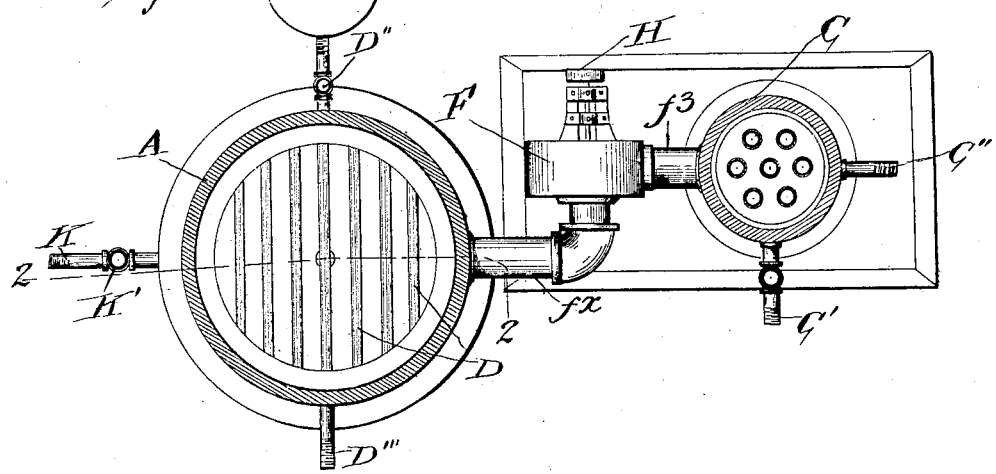
Witnesses
Paul Gathmann
Otto Gathmann
Inventor
Louis Gathmann No. 761,041.

Patented May 24, 1904.

UNITED STATES PATENT OFFICE.

LOUIS GATHMANN, OF WASHINGTON, DISTRICT OF COLUMBIA, ASSIGNOR OF ONE-FOURTH TO ELDRED P. DICKINSON AND SOMERSET R. WATERS, OF WASHINGTON, DISTRICT OF COLUMBIA.

DRIER.

SPECIFICATION forming part of Letters Patent No. 761,041, dated May 24, 1904.

Application filed October 1, 1903. Serial No. 175,339. (No model.)

*To all whom it may concern:*

Be it known that I, LOUIS GATHMANN, a citizen of the United States, residing at Washington, in the District of Columbia, have invented certain new and useful Improvements in Driers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to drying apparatus, and more particularly to apparatus for carrying out the process described in my application for a patent of the United States filed on or about the 9th day of February, 1903, Serial No. 142,653. An apparatus to carry out the said process and to be adapted to the drying generally of substances or materials, whether of natural or artificial derivation or production, should embody the following essential features, to wit: A closed circuit comprising a drying-chamber, means to interrupt the continuity of the circuit to substantially cut out said chamber, means to produce a vapor-laden and vapor-saturated atmosphere in the drying-chamber, means to induce circulation of the vaporous atmosphere through the drying chamber and circuit, and means to restore the lost heat to the vaporous atmosphere in combination with means to lower the temperature of the vaporous atmosphere to a condensing temperature after it has passed out of contact with the substance or material to be dried, and means to graduate and regulate the condensation relatively to the restored heat, so that the vaporous atmosphere will flow out of contact with the substance or material to be dried in a more or less saturated condition until near the end of the operation or until the vapor evolved from said substance or material is insufficient to saturate the air, at which time the material will be dry internally, when condensation is or may be proceeded with substantially as fast as vapor is evolved from said substance or material, whereby the external portions thereof are dried last.

In the accompanying drawings I have illustrated a drier embodying the essential features above referred to, Figure 1 illustrating the apparatus in elevation, partly in section, on line 2 2 of Fig. 2, which latter is a horizontal section on line 1 1 of Fig. 1.

Referring to the drawings, A indicates the drying apparatus; B, the drying-chamber, having an annular ledge $b$ for the support, for instance, of a foraminous partition or basket (not shown) and containing the substance or material to be dried, the bottom of said chamber being conical and having an outlet-pipe K, controlled by a valve K' for drawing off the condensate, and above said bottom is arranged a heater-condenser D. The lower part L of the drying-chamber, below the ledge $b$ and above the heater-condenser D, is connected to the intake $f^\times$ of the casing F of a fan-blower, whose discharge $f^3$ is connected to the lower end of the heating-space of a heater C of any suitable construction—as, for instance, a tubular heater—whose tubes are supplied with a heating medium, as steam, through pipe connection C', such steam being exhausted through pipe C'', which may be a return-pipe to the boiler. (Not shown.) The heating-space of heater C is connected at its upper end by a pipe P to the upper head of the drying-chamber, said pipe being provided with a valve V for controlling the flow of fluid to the drying-chamber B and for interrupting the continuity of the circuit and practically cutting said chamber out of said circuit, as it is obvious that when a basket, for instance, charged with material to be dried is suspended from the ledge $b$ said basket practically forms a bottom for the chamber, while the lower part L of said drying-chamber becomes a heating or condensing chamber, as will be hereinafter more particularly explained.

For the purpose of controlling the supply of heating or cooling medium to the heater-condenser D, I provide a separate vessel D', connected to said heater-condenser by a pipe provided with a valve D''. The fluid to be heated or the cooling agent is supplied to vessel D' through valve-controlled pipe $d$. The vessel D' is provided with burners, to which a suitable fuel, gaseous or liquid, is supplied through pipe $d'$, having valve-controlled branch pipes $d^2$ leading to said burners. (Not shown.) I am thus enabled to supply a heating medium to the heater-condenser D to gradually decrease the temperature thereof or to supply a cooling medium to said heater-condenser of any desired or required low temperature for condensing purposes, the heating or cooling agent being exhausted from the condenser through pipe D'', which may be a return-pipe to vessel D' or to a receiver or condenser, according to the nature of the heating or cooling fluid supplied to vessel D'.

The operation of the apparatus and the mode of procedure will in a great measure depend upon the substance or material to be dried. If the substance or material to be dried contains quite a large percentage of vaporizable matter, I produce a saturated atmosphere in the drying-chamber by closing valve V and supplying heat to the heater-condenser D to heat the substance or material until a vaporizing temperature has been produced and until sufficient vapor has been evolved from the substance or material to saturate the atmosphere confined in the drying-chamber. I then open the valve V, supply heat to the heater C, and set the fan in operation to cause the saturated atmosphere to circulate through the drying-chamber B and circuit, and so regulate the heat supplied by said heater C as to maintain the saturated atmosphere at a vaporizing temperature. I then lower the temperature below the substance to be dried to a condensing temperature, which latter is then so regulated relatively to the heat restored to the vaporous atmosphere as to gradually condense the vapors, so that the atmosphere or air will at all times be vapor-laden after it passes out of the lower part L of the drying-chamber to be again heated to a vaporizing temperature before it again passes into the drying-chamber proper until near the end of the operation or until the vapors evolved from the substance are insufficient to saturate the air, when condensation can be carried on as fast as the said vapors are evolved by suitably regulating the temperature in the lower part L of the drying-chamber until the substance or material is dried. If, on the other hand, the substance or material is bulky, more or less porous, and a poor conductor of heat, or when the substance is very dense and contains a comparatively low percentage of vaporizable matter, I first produce a vaporous atmosphere in the drying-chamber by heat supplied through the heater-condenser D while such atmosphere is confined in said chamber. I then establish the circulation and gradually increase the temperature of the vapor-laden atmosphere to heat the material through and through until a vaporizing temperature has been reached to saturate the atmosphere and then begin condensation and proceed as above described, whereby surface drying and consequent imperfect drying and injury to the substance or material are effectively avoided.

I do, of course, not limit myself to the form of the drying-chamber described and shown, as this may be varied in accordance with the nature or character of the substance or material to be dried.

Having thus described my invention, what I claim as new therein, and desire to secure by Letters Patent, is—

1. Apparatus comprising a pipe-circuit including a drying-chamber, means to restore lost heat to the circulating fluid and means to induce a forced circulation through the circuit; in combination with a heater-condenser in said drying-chamber and means to supply a heating or cooling agent to said heater-condenser, for the purpose set forth.

2. Apparatus comprising a pipe-circuit including a drying-chamber, means to restore lost heat to the circulating fluid, and means to induce a forced circulation through the circuit; in combination with a heater-condenser in said drying-chamber, means to supply a heating or cooling agent to said heater-condenser and means to cut the drying-chamber out of the circuit, for the purpose set forth.

3. Apparatus comprising a pipe-circuit including a drying-chamber, means to maintain a condensing temperature in the lower part of said chamber, means to induce a forced circulation downwardly through the chamber and back to the upper part thereof and means to restore lost heat to the circulating fluid after it leaves the lower part of the chamber, for the purposes set forth.

4. Apparatus comprising a pipe-circuit including a drying-chamber, a heater-condenser at the foot thereof, a heater interposed in the circuit between said heater-condenser and the upper end of the drying-chamber and means interposed in the circuit between the heater-condenser and heater to induce a forced circulation through said circuit, for the purposes set forth.

5. Apparatus comprising a pipe-circuit including a drying-chamber, a heater and means between said heater and the lower part of the drying-chamber to induce a forced circulation through the chamber, heater, and back to the upper part of said chamber; in combination with a heater-condenser in the lower part of said drying-chamber and a cut-off valve between the upper part of said chamber and the first-named heater, for the purposes set forth.

In testimony that I claim the foregoing as my invention I have signed my name in presence of two subscribing witnesses.

LOUIS GATHMANN.

Witnesses:
HENRY ORTH, Jr.,
B. W. SOMMERS.